Feb. 9, 1965 J. E. BORAH 3,169,025
MOLDED GASKET WITH PARTIALLY EXPOSED, EXPANDABLE
AND CONTRACTIBLE METAL BEADED CHAIN
Filed Jan. 22, 1962 2 Sheets-Sheet 1

INVENTOR.
JOHN E. BORAH
BY *Hobbs & Easton*
ATTORNEYS

INVENTOR.
JOHN E. BORAH
BY *Hobbs & Easton*
ATTORNEYS

United States Patent Office 3,169,025
Patented Feb. 9, 1965

3,169,025
MOLDED GASKET WITH PARTIALLY EXPOSED, EXPANDABLE AND CONTRACTIBLE METAL BEADED CHAIN
John E. Borah, 815 Mishawaka Ave., Mishawaka, Ind.
Filed Jan. 22, 1962, Ser. No. 167,517
3 Claims. (Cl. 277—235)

The present invention relates to a gasket and more particularly to an annular gasket of rubber or rubber-like material having a partially exposed, expandable and contractible metal beaded chain embedded therein.

Gaskets used in forming joints in tubes and pipes frequently contain metal inserts for the purpose of forming good electrical connections between the adjoining sections and coupling parts. Various types of metal inserts have been used, including beaded chains and annular-shaped coil springs. In order for these inserts to conduct an electrical current effectively between the adjoining pipe sections, it is necessary that they be partially exposed in such a manner that metal-to-metal contact is established between the pipe or tube, insert and fitting. In the past, these inserts, for example the beaded chain-type inserts, were exposed intermittently in small areas along the internal and external surfaces, and were spaced inwardly from the end of the gasket, often being produced by molding an annularly-shaped gasket of rubber or rubber-like material with the beaded chain initially fully embedded in the rubber gasket, and thereafter abrading the gasket to expose at least a portion of the insert along the internal and external surfaces.

A greatly improved fabricating method and mold has resulted in an improved gasekt in which the beaded chain is initially partially exposed when the gasket is removed from the mold, thus creating a gasket having uniformly exposed, clean, well defined bead portions for forming effective metal-to-metal contact between the insert and the pipe and fitting. These chains, however, in the past have been placed in the mold and molded in the gasket in taut or substantially taut condition so that, while the gasket could be effectively compressed when forming a joint, it could not be expanded in the area around the chain without causing damage to the gasket since the chain could not expand further than the condition in which it was molded into the gasket. Further, some difficulty was occasionally encountered in molding chains in the gasket in their taut or substantially taut condition in that tolerance limits on the short side sometimes interferred with the proper seating of the chain in the mold cavity, thus resulting in a misplaced beaded insert in the final gasket, and consequently resulting in rejections and increased production cost.

It is therefore one of the principal objects of the present invention to provide a molded gasket of ruber or rubber-like material having a partially exposed, expandable and contractible beaded chain molded therein with the beads being equally spaced from one another and the chain molded in substantially less than its taut condition in order to permit natural expansion of the gasket in the area surrounding the beads and to permit the beaded chain to properly seat in the mold cavity within a wide range of tolerances.

Another object of the invention is to provide a gasket of rubber or rubber-like material having partially embedded therein an annular expandable and contractible beaded chain in which the connecting stems between the beads are fully embedded and the beads are uniformly spaced and exposed throughout the circumferential portion of the chain.

Still another object of the invention is to provide a molded, annularly-shaped gasket of ruber or other resilient plastic material, having an expandable and contractible beaded chain at least partially embedded therein with the beads thereof being spaced closer together than the maximum distance permitted by the stems interconnecting the beads, thereby permitting expansion and contraction of the chain as the resilient material forming the gasket is expanded and contracted.

A further object of the invention is to provide a method and mold for producing gaskets of the aforementioned type containing the less than taut, expandable and contractible beaded chain with uniformly spaced beads in partially exposed condition.

Further objects and advantages of the present invention will become apparent from the following description and accompanying drawings, wherein.

Figure 6:
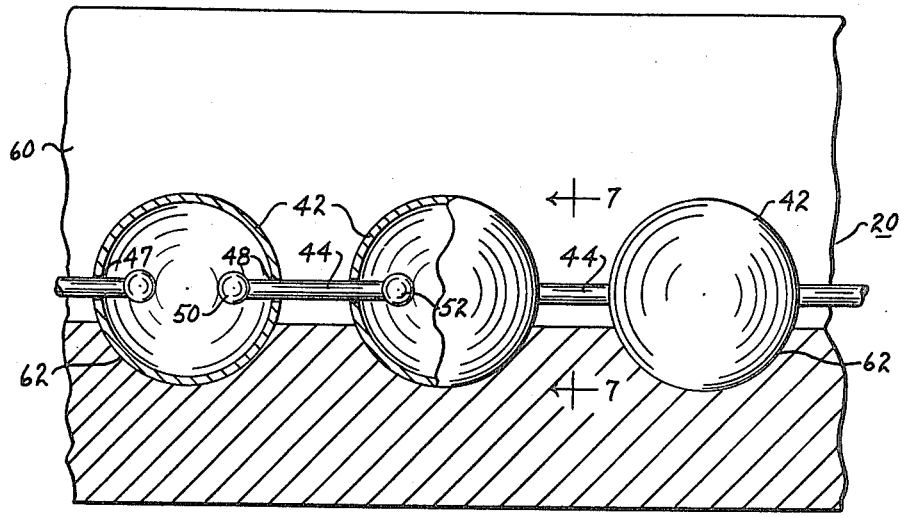
FIGURE 6 is a fragmentary vertical cross sectional view through a mold section for producing gaskets of the aforesaid type, showing a beaded chain insert in partial cross section seated in the mold cavity ready for receiving the moldable material therein.
Figure 7:
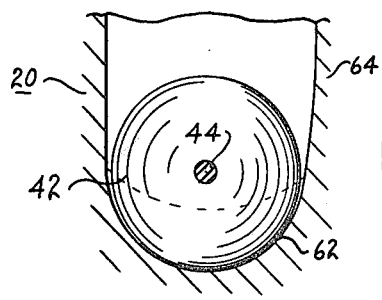
FIGURE 7 is a fragmentary cross sectional view of the mold section shown in FIGURE 6, taken on line 7—7 of the latter figure and showing one bead of the chain seated in a recess in the bottom of the cavity.

Referring more specifically to the drawings, FIGURES 1 through 5 and 8 illustrate a gasket 10 embodying the present invention and the manner in which the gasket is assembled in a joint 12 and held in sealing relation with a pipe 14 and threaded fitting 16 by a nut 18, a partially exposed, expandable and contractible beaded chain in the gasket forming an effective metal-to-metal electrical connection between the pipe and fitting. The method and mold for producing this type of gasket are illustrated in FIGURES 6 and 7, the mold section 20 in the two figures being the bottom plate of a transfer mold of the general type shown in detail and claimed in my copending patent application, Serial No. 1,924, filed on January 12, 1960, now U. S. Patent No. 3,095,611. The mold is adapted to be assembled during the molding operation after the beaded chain has been placed in the mold cavity.

Figure 1:
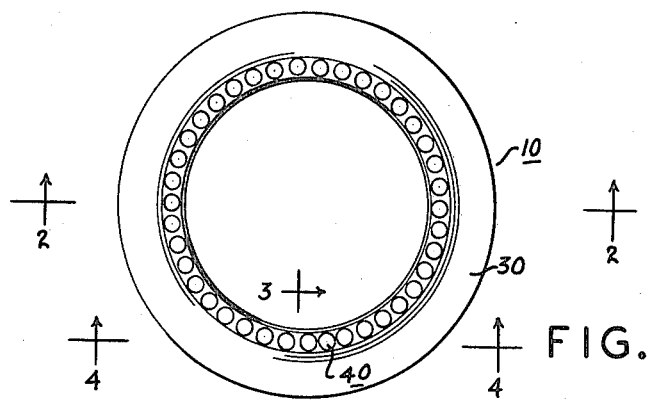
FIGURE 1 is an enlarged, elevational view of a gasket having a beaded chain insert and embodying one form of the present invention.
Figure 2:
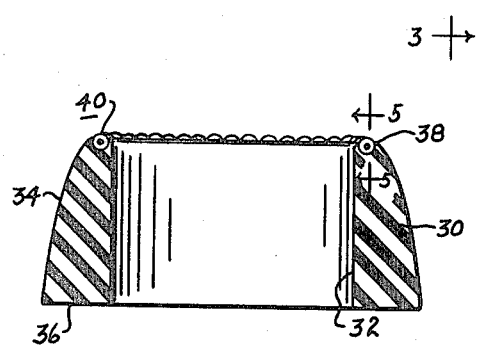
FIGURE 2 is a vertical cross sectional view of the gasket shown in FIGURE 1, taken on line 2—2 of the latter figure.
Figure 3:
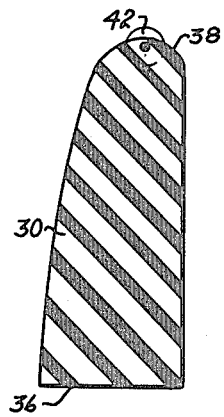
FIGURE 3 is an enlarged fragmentary cross sectional view of the gasket shown in FIGURES 1 and 2, taken on line 3—3 of FIGURE 1.
Figure 4:
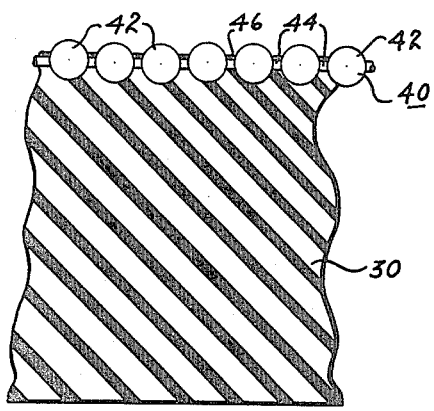
FIGURE 4 is an enlarged cross sectional view of the gasket shown in the preceding figures, taken on line 4—4 of FIGURE 1.
Figure 8:
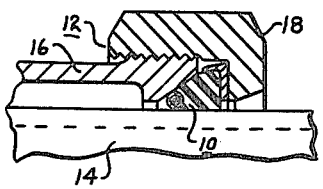
FIGURE 8 is a fragmentary view of a pipe and fitting with the present gasket assembled therebetween in sealing relationship.
Figure 5:
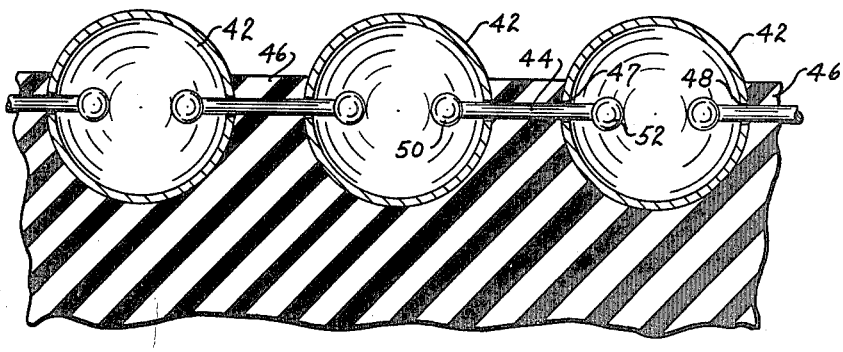
FIGURE 5 is a further enlarged fragmentary cross sectional view of the gasket and beaded chain insert, the section being taken on line 5—5 of FIGURE 2.

The present gasket consists of an annular member 30 of rubber or rubber-like material having a cylindrical internal surface 32 and an arcuate tapered external surface 34 beginning at a relatively large end 36 and terminating at a relatively small end 38, and having a beaded chain 40 partially embedded therein. As seen in FIGURES 3 and 4, the beads 42 of the chain are embedded in the molded body 30 somewhat greater than half of the diameter of the beads, and stems 44 connecting the beads are fully embedded in the body with a portion 46 of the molded rubber body extending completely around the stems, firmly securing the expandable and contractible beaded chain in the gasket.

The beaded chain 40 of the structure forming the present invention consists of hollow spherical beads 42, loosely connected by stems 44 extending through holes 47 and 48 in opposite sides of the bears and having heads 50 and 52 on opposite ends thereof of sufficient diameter to prevent the stems from becoming disconnected from the respective beads. One of the principal features of the present invention is the insertion of the beaded chain in the gasket with the beads thereof being closer together than the maximum spacing permitted by the individual stems. This contracted condition is clearly illustrated in FIGURES 5 and 6, wherein the heads 50 and 52 of stems 44 are spaced inwardly from the internal surface of the respective beads. It is seen that this construction permits the resilient rubber or rubber-like material forming body 30 to expand and contract adjacent the beaded chain without any interference from the chain and without damage to the gasket from displacement of the rubber from the parts of the chain. The amount of contraction from a fully taut chain is preferably within the range of approximately two to ten percent of the chain length; however, this range may vary from one type of gasket to another to saitsfy the expansion and contraction requirements of the particular gasket.

Another important consideration in the present invention is the equal spacing of the beads from one another throughout the circumference of the gasket. This is accomplished with the use of a special mold section 60 having a series of substantially hemispherically-shaped recesses 62 in the bottom thereof for receiving beads 42 of the chain and retaining the beads in the desired spaced relationship from one another during the molding operation, so that the final gasket will contain the beads partially exposed and equally spaced from one another as illustrated in FIGURES 1 through 4 of the drawings.

During the molding operation, the endless expandable and contractible beaded chain is inserted in the mold over cylindrical core 64 by merely dropping the chain around the core. The beads tend to fall in the recesses 62; however, it is often desirable to agitate the chain by some means, preferably with an instrument such as an elongated dull-pointed stem drawn rapidly over a substantial section of the chain. This operation causes the beads of the chain to vibrate and settle into the individual recesses where they are held during the molding operation by the incoming moldable material flowing downwardly over the portions of the beads and stems extending above the recesses.

The gasket forming the subject matter of this invention may be of various sizes and shapes necessary to satisfy installation requirements.

Although only one embodiment of the invention has been described in detail herein, modifications and changes may be made without departing from the scope of the inventive concept.

I claim:
1. A gasket comprising a molded annular body portion of rubber-like material having internal and external walls, the internal wall defining the center opening of said body portion being substantially parallel with the axis of the opening, the external wall being tapered inwardly from one end to the other forming a relatively large flat annular end on a plane transverse to the axis of said opening and a relatively small annular end, and a continuous expandable and contractible chain disposed in the small end of said body portion and consisting of hollow spherical beads with diametrically disposed holes and wire-like stems connecting said beads and extending through said holes and having enlarged ends for preventing separation of said stems from the respective beads, said beads being equally spaced from one another and partially embedded in one end of said body portion, and said stems being fully embedded in said body portion with at least one of the enlarged ends of each stem being spaced from the portion of the bead defining one of the holes through which it passes.

2. A gasket comprising an annular body portion of rubber-like material, and a continuous annularly-shaped chain disposed in one end of said body portion and consisting of hollow spherical beads with diametrically disposed holes and wire-like stems connecting said beads and extending through said holes and having enlarged ends for preventing separation of said stems from the respective beads, said beads being equally spaced from one another and partially embedded in one end of said body portion, and said stems being fully embedded in said body portion with at least one of the enlarged ends of each stem being spaced from the portion of the bead defining one of the holes through which it passes.

3. A gasket comprising an annular body portion of resilient material, and an expandable and contractible chain disposed in one end of said body portion and consisting of hollow beads with diametrically disposed holes and stems connecting said beads and extending through said holes and having enlarged ends for preventing separation of said stems from the respective beads, said beads being partially embedded in one end of said body portion, and said stems being fully embedded in said body portion with at least one of the enlarged ends of each stem being spaced from the portion of the bead defining one of the holes through which it passes.

References Cited in the file of this patent
UNITED STATES PATENTS

| | | |
|---|---|---|
| 1,984,806 | Pfefferle | Dec. 18, 1934 |
| 2,945,390 | Bush et al. | July 19, 1960 |
| 3,056,617 | Snoddy | Oct. 2, 1962 |